United States Patent

Suzui

(10) Patent No.: US 10,203,584 B2
(45) Date of Patent: Feb. 12, 2019

(54) CONTROLLING APPARATUS AND LENS APPARATUS INCLUDING SAME

(71) Applicant: CANON KABUSHIKI KAISHA, Tokyo (JP)

(72) Inventor: Masaki Suzui, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/649,867

(22) Filed: Jul. 14, 2017

(65) Prior Publication Data

US 2018/0046061 A1 Feb. 15, 2018

(30) Foreign Application Priority Data

Aug. 10, 2016 (JP) ................... 2016-157576

(51) Int. Cl.
| | |
|---|---|
| *G03B 3/10* | (2006.01) |
| *G03B 13/34* | (2006.01) |
| *H04N 5/232* | (2006.01) |
| *G03B 5/00* | (2006.01) |
| *G03B 9/06* | (2006.01) |

(52) U.S. Cl.
CPC ............. *G03B 3/10* (2013.01); *G03B 5/00* (2013.01); *G03B 9/06* (2013.01); *G03B 13/34* (2013.01); *H04N 5/232* (2013.01); *G03B 2205/0053* (2013.01)

(58) Field of Classification Search
CPC ... G03B 3/10; G03B 5/00; G03B 9/06; H04N 5/232
USPC .......................................................... 396/133
See application file for complete search history.

(56) References Cited

U.S. PATENT DOCUMENTS

| | | | | |
|---|---|---|---|---|
| 2004/0095026 A1* | 5/2004 | Vaknin | ................... | H02K 41/03 310/12.24 |
| 2011/0043768 A1* | 2/2011 | Nakayama | ............. | G02B 27/48 353/38 |
| 2012/0081803 A1* | 4/2012 | Kuwano | .................. | G02B 7/08 359/824 |

FOREIGN PATENT DOCUMENTS

| | | |
|---|---|---|
| JP | H0471383 A | 3/1992 |
| JP | H05127061 A | 5/1993 |
| JP | 2013031333 A | 2/2013 |

* cited by examiner

*Primary Examiner* — Clayton E Laballe
*Assistant Examiner* — Linda B Smith
(74) *Attorney, Agent, or Firm* — Rossi, Kimms & McDowell LLP

(57) ABSTRACT

Provided is controlling apparatus for an electric motor which is driven in accordance with a driving signal input through electric contacts held in slide contact with each other, the controlling apparatus including: a superimposed signal generating unit, which generates a superimposed signal having a peak voltage higher than a voltage of the driving signal; and a controlling unit, which generates the driving signal based on a controlling signal input so as to control the driving of the electric motor, and superimposes the superimposed signal onto the driving signal and output the resultant signal to the electric motor, the controlling unit superimposing the superimposed signal onto the driving signal and outputting the resultant signal to the electric motor when a state in which the driving signal is lower than a predetermined voltage continues for a time period which is longer than a predetermined time period.

12 Claims, 10 Drawing Sheets

CONTROLLING APPARATUS AND LENS APPARATUS INCLUDING SAME

BACKGROUND OF THE INVENTION

Field of the Invention

The present invention relates to a controlling apparatus for an electric motor, more particularly, to a controlling apparatus for an electric motor that is driven in accordance with a driving signal input through electric contacts held in slide contact with each other, and to a lens apparatus including the controlling apparatus.

Description of the Related Art

Hitherto, there has been known a technology of driving a movable part including a zoom lens, a focus lens, an iris mechanism, and an extender lens with use of motors in a lens apparatus. One example of such a technology is disclosed in Japanese Patent Application Laid-Open No. H05-127061.

However, when a motor including electric contacts is used in the technology disclosed in Japanese Patent Application Laid-Open No. H05-127061, continuous operation of the above-mentioned movable part at low voltage and low current causes increase in contact resistance between the electric contacts, with the result that a defect involving unstable motor operation occurs.

SUMMARY OF THE INVENTION

In view of the above, the present invention has an object to provide a controlling apparatus for an electric motor including electric contacts held in slide contact with each other, which is capable of preventing increase in contact resistance between the electric contacts and thereby stabilizing motor operation even in a state of continuous operation at low voltage and low current.

In order to achieve the above-mentioned object, according to one embodiment of the present invention, there is provided a controlling apparatus for an electric motor which is driven in accordance with a driving signal input through electric contacts held in slide contact with each other, the controlling apparatus including: a superimposed signal generating unit, which generates a superimposed signal having a peak voltage higher than a voltage of the driving signal; and a controlling unit, which generates the driving signal based on a controlling signal input so as to control the driving of the electric motor, and superimposes the superimposed signal onto the driving signal and output the resultant signal to the electric motor, wherein the controlling unit superimposes the superimposed signal onto the driving signal and outputs the resultant signal to the electric motor when a state in which the driving signal is lower than a predetermined voltage continues for a time period which is longer than a predetermined time period.

The controlling apparatus according to the present invention is capable of avoiding the increase in contact resistance between the electric contacts due to the continuous operation at low voltage and low current, thereby being capable of preventing the unstable motor operation.

Further features of the present invention will become apparent from the following description of exemplary embodiments with reference to the attached drawings.

DESCRIPTION OF THE EMBODIMENTS

Figure 1:
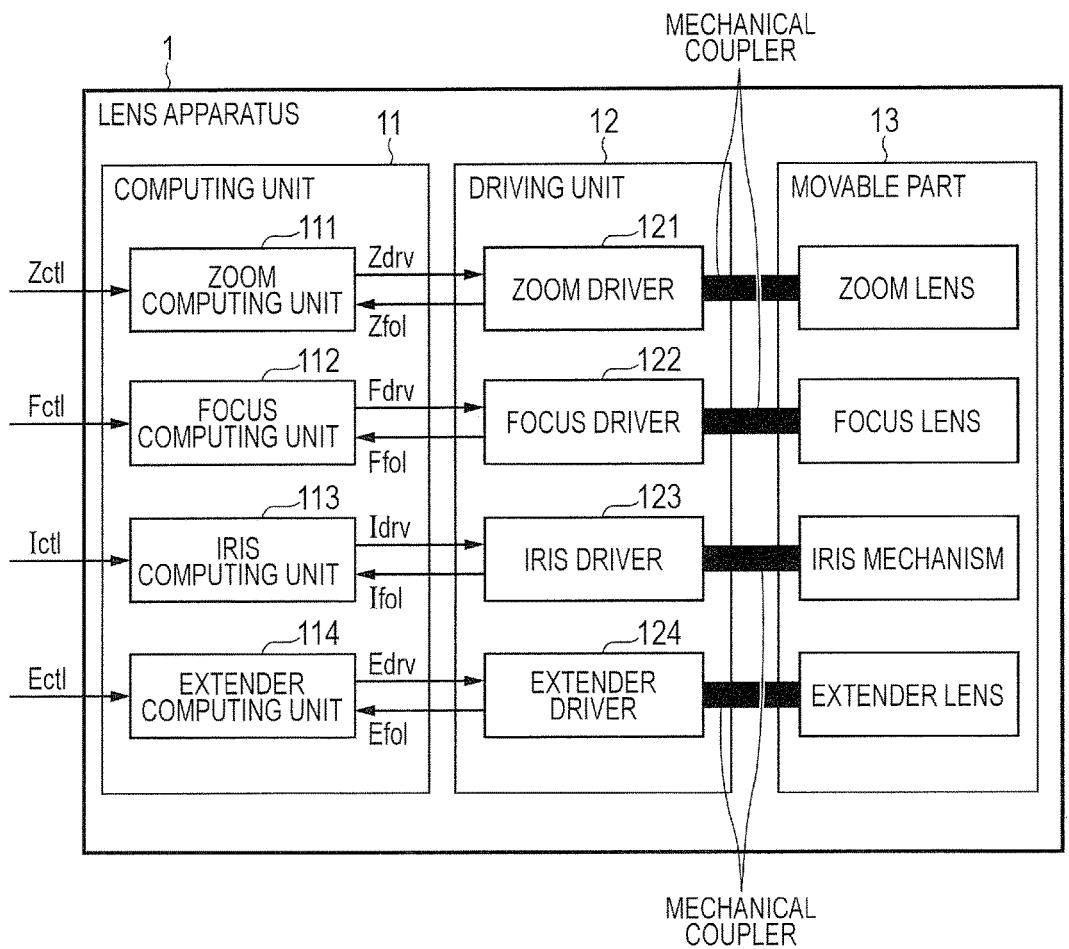
FIG. 1 is a function block diagram of a lens apparatus 1 according to a first embodiment of the present invention.

Detailed description is made of a controlling apparatus according to the present invention based on embodiments illustrated in the drawings.

First Embodiment

With reference to FIG. 1 to FIG. 5, description is made of a lens apparatus including a controlling apparatus according to a first embodiment of the present invention.

FIG. 1 is a diagram for illustrating a lens apparatus 1 including a controlling apparatus according to the first embodiment of the present invention. The lens apparatus 1 mainly includes a computing unit 11, a driving unit 12, and a movable part 13.

The movable part (movable optical members and driven parts) 13 includes a zoom lens, a focus lens, an iris mechanism, and an extender lens, which are drive targets of the driving unit 12. The driving unit 12 is a driving unit configured to drive the movable part 13, and includes a zoom driver 121, a focus driver 122, an iris driver 123, and an extender driver 124.

The computing unit 11 is a computing unit configured to generate driving signals for driving the driving unit 12 of the lens apparatus 1, and includes a zoom computing unit 111, a focus computing unit 112, an iris computing unit 113, and an extender computing unit 114. Further, based on control signals (controlling signals) Zctl, Fctl, Ictl, and Ectl for the zoom lens, the focus lens, the iris mechanism, and the extender lens of the movable part 13, which are to be input to the lens apparatus 1, and based on position signals Zfol, Ffol, Ifol, and Efol for the movable part 13, which are to be output by the driving unit 12, the computing unit 11 outputs driving signals Zdrv, Fdrv, Idrv, and Edrv to perform feedback control on the movable part 13.

The zoom driver 121, the focus driver 122, the iris driver 123, and the extender driver 124 are coupled to the zoom lens, the focus lens, the iris mechanism, and the extender lens through intermediation of mechanical couplers, respectively, to drive the zoom lens, the focus lens, the iris mechanism, and the extender lens.

Figure 2:
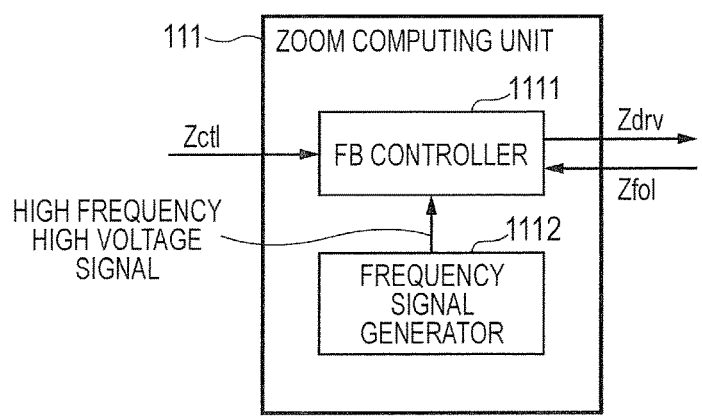
FIG. 2 is a function block diagram for illustrating a zoom computing unit 111 of the first embodiment.

Next, with reference to FIG. 2, detailed description is made of the computing unit 11.

FIG. 2 is a function block diagram of each of the zoom computing unit 111, the focus computing unit 112, the iris computing unit 113, and the extender computing unit 114. Each computing unit includes an FB controller (controlling unit) 1111 and a frequency signal generator (superimposed signal generating unit) 1112. Here, the "FB" is an abbreviation for "feedback".

The zoom computing unit 111, the focus computing unit 112, the iris computing unit 113, and the extender computing unit 114 act on different control targets but have the same configuration. Accordingly, description is made of only the zoom computing unit 111. The zoom computing unit 111 receives input of the control signal Zctl and the position signal Zfol for the above-mentioned zoom lens, generates a feedback control target value (hereinafter also described as "FB control target value"), and superimposes a high frequency high voltage signal described later. After that, the zoom computing unit 111 outputs the driving signal Zdrv for driving the zoom driver 121. The frequency signal generator 1112 is also a signal generator configured to generate the high frequency high voltage signal.

Figure 3:
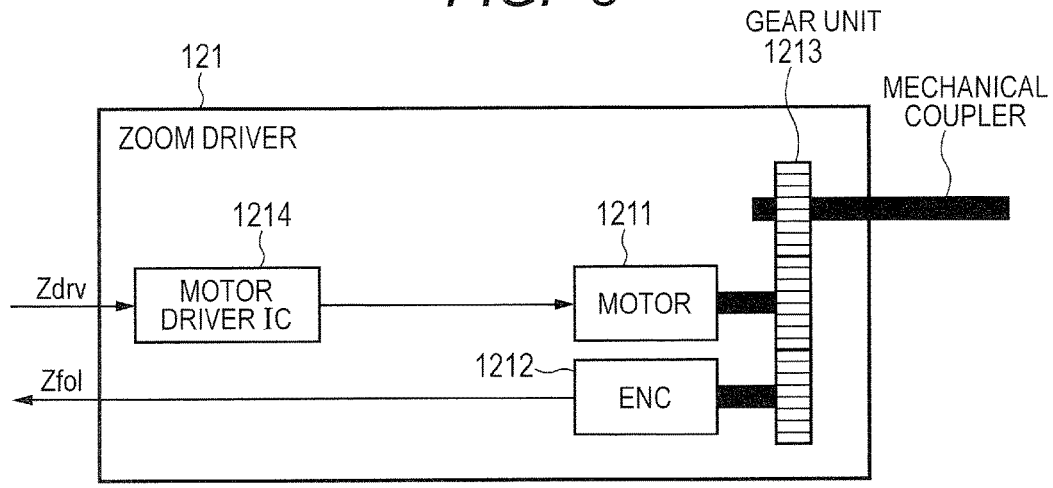
FIG. 3 is a function block diagram for illustrating a zoom driver 121 of the first embodiment.

Next, with reference to FIG. 3, detailed description is made of the driving unit 12.

FIG. 3 is a function block diagram of each of the zoom driver 121, the focus driver 122, the iris driver 123, and the extender driver 124.

The drivers act on different drive targets but have the same configuration. Accordingly, description is made of only the zoom driver 121.

The zoom driver 121 includes a motor (electric motor) 1211, an ENC 1212, a gear unit 1213, and a motor driver IC 1214.

The motor 1211 is a well-known and well-used DC motor including a commutator and a brush, which are electric contacts held in slide contact with each other. The ENC 1212 is a well-known and well-used encoder for position detection. The gear unit 1213 is a transmission mechanism which is configured to connect the motor 1211 and the ENC 1212 to the mechanical coupler which is coupled to the movable part 13. The motor driver IC 1214 is a well-known and well-used IC for driving of the DC motor. The motor driver IC 1214 receives input of the driving signal Zdrv for the zoom lens and output a driving voltage for driving the motor.

With the configuration described above, the motor 1211 is driven based on the driving signal Zdrv for the zoom lens. The ENC 1212 detects the driving and outputs the position signal Zfol. The zoom lens of the movable part 13 is driven through intermediation of the gear unit 1213.

Figure 4:
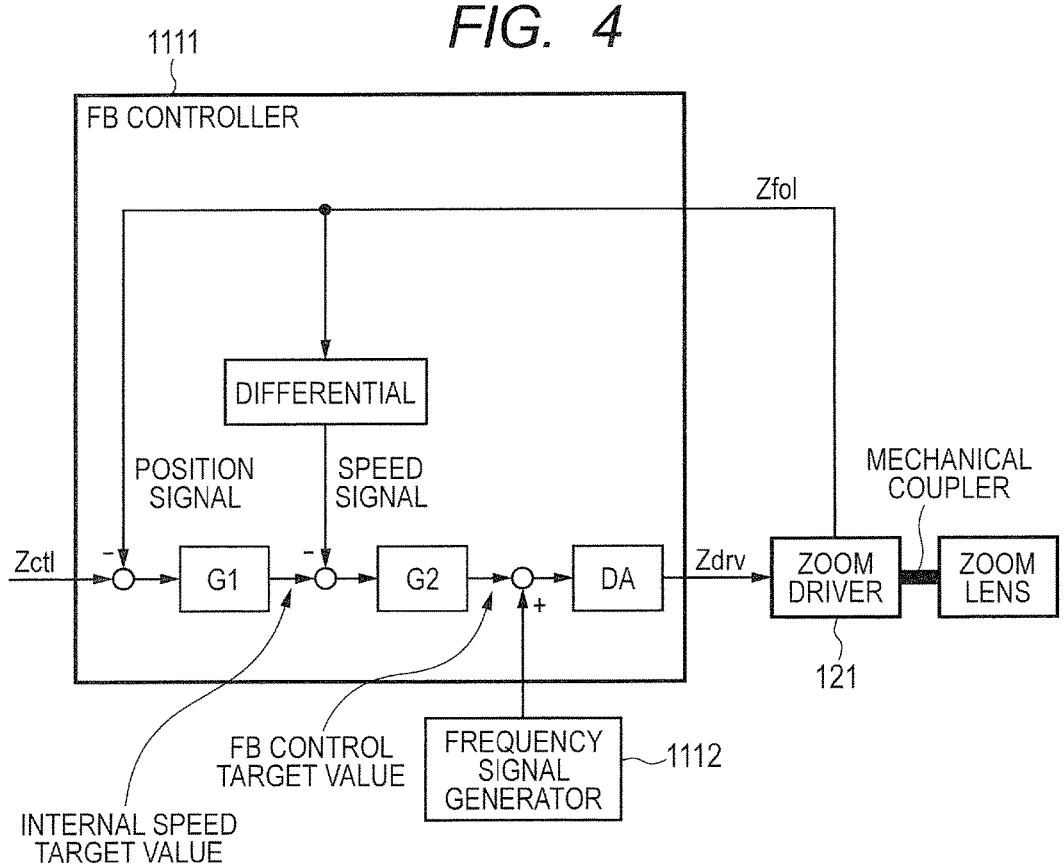
FIG. 4 is a function block diagram for illustrating an FB controller 1111 of the first embodiment.

Next, with reference to FIG. 4, detailed description is made of the FB controller 1111.

FIG. 4 is a function block diagram of the FB controller 1111.

In detail, the FB controller 1111 receives input of the control signal Zctl for the zoom lens and the position signal Zfol for the zoom lens, computes a difference between the control signal Zctl and the position signal Zfol, and multiplies the computed difference by a gain G1, to thereby generate an internal speed target value. Further, the FB controller 1111 multiplies a difference between a speed signal, which is obtained as a result of subjecting the position signal Zfol for the zoom lens to differentiation, and the internal speed target value by a gain G2, to thereby generate the FB control target value. Finally, the FB controller 1111 superimposes the high frequency high voltage signal of the present invention and outputs the driving signal Zdrv for the zoom lens through a DA converter.

Figure 5:
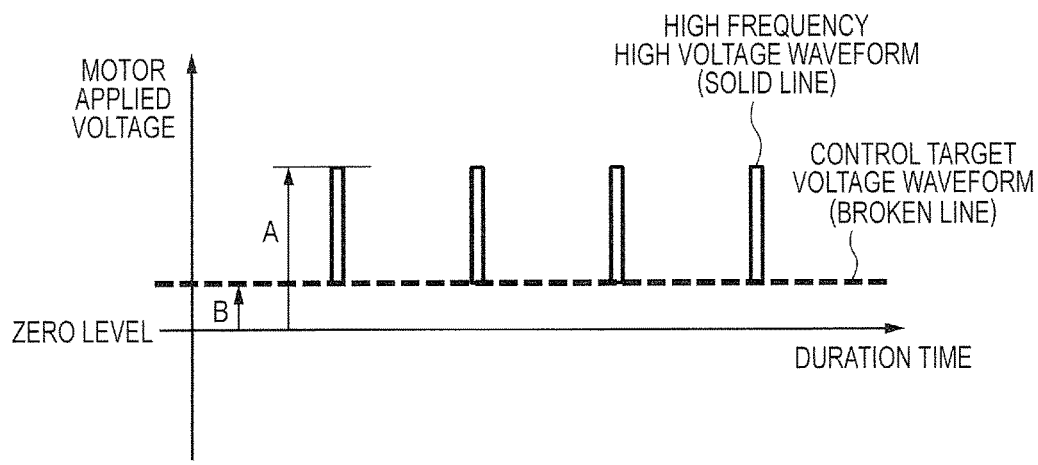
FIG. 5 is a schematic diagram for illustrating a waveform of a high frequency high voltage signal of the first embodiment.

Next, with reference to FIG. 5, description is made of the high frequency high voltage signal, which is generated by the frequency signal generator 1112.

FIG. 5 is a schematic diagram for illustrating a waveform of the high frequency high voltage signal.

When the motor is continuously driven at low voltage or at low current, a contact resistance between the commutator and the brush, which are the electric contacts of the motor, may increase. As a result, a defect may occur in the motor operation. Such a defect can be eliminated through application of a voltage, which is higher than a driving voltage given in a low voltage low current state, to the motor.

When a DC signal having a peak value B, which is indicated by the broken line of FIG. 5, is defined as a signal of the motor driving voltage given in the low voltage low current state, a signal having a voltage with a peak value A, which is higher than that of the DC signal, and having a pulse-shaped waveform with a frequency higher than responsiveness of the control target (zoom driver 121 or the zoom lens) is defined as a high frequency high voltage signal.

Such a configuration can eliminate the defect of the motor, which may occur due to continuation of the low voltage low current state. At the same time, the effect of preventing irrelevant movement of the control target can be obtained.

In general, in view of a backlash component such as a backlash in the driving unit, or in view of a weight (inertia force) of the movable part of the optical lens, the frequency for driving of the DC motor or for movement of the optical lens is lower than 20 Hz in many cases, and the driving voltage of the DC motor during driving is lower than 1 V in many cases. Accordingly, as a reference, the high frequency high voltage driving signal of the first embodiment has a frequency which is set within a range of equal to or higher than 20 Hz and equal to or lower than 100 Hz, and has a peak voltage which is set equal to or higher than 1 V, that is, set to be higher than the driving voltage. That is, the frequency signal generator (superimposed signal generating unit) generates a superimposed signal which prevents movement of the DC motor (electric motor) or a driven part driven by the DC motor.

It is preferred that the frequency and the driving voltage be set in consideration of the responsiveness of the control target. In particular, it is preferred that the frequency and the driving voltage be set so as to prevent movement of the optical lens (driven part). Alternatively, it is preferred that the frequency and the driving voltage be set so as to prevent movement of the DC motor (driving unit) itself.

However, when a higher frequency is applied to the motor, noise generated from the motor, the driving unit, or the like becomes more conspicuous, with the result that mechanical stress on the motor or the driving unit becomes less negligible. Therefore, when the frequency is to be set higher, it is necessary to reduce the peak value and an effective value of the driving voltage.

It is not always necessary that the signal having a peak voltage higher than that of the driving signal be a repetitive signal with a constant cycle, and the frequency may be changed. Further, a single pulse signal such as an impulse signal may be employed. Also in this case, it is similarly preferred that a signal (waveform (repetitive signal or single pulse signal) and peak voltage) which prevents movement of the DC motor (driving unit) itself or the optical lens (driven part) driven by the DC motor.

Second Embodiment

Description is made of a second embodiment of the present invention.

A lens apparatus 2 according to the second embodiment is different from the lens apparatus 1 according to the first embodiment in that a high frequency high voltage is superimposed only under a certain condition, and in that a computing unit 21 is used in place of the computing unit 11. Now, description is made of the above-mentioned difference.

Figure 6:
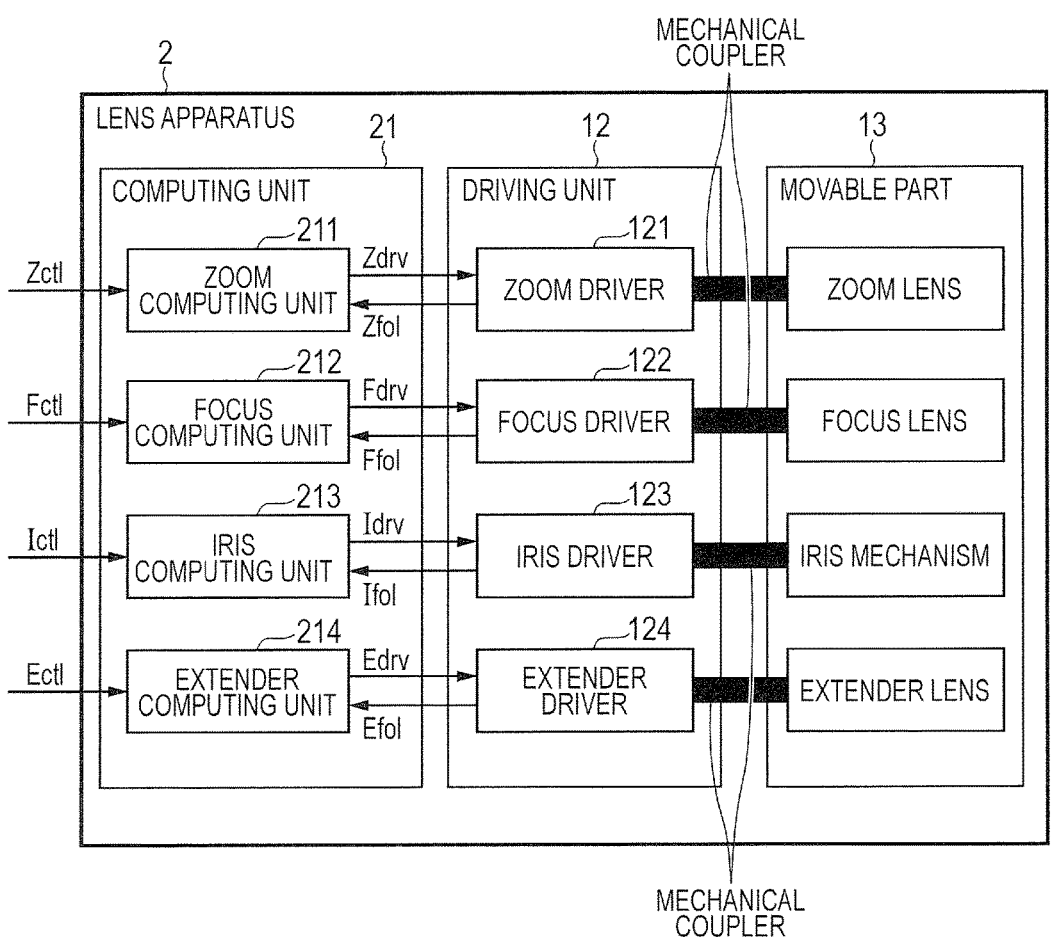
FIG. 6 is a function block diagram of a lens apparatus 2 according to a second embodiment of the present invention.

FIG. 6 is a function block diagram of the lens apparatus 2 according to the second embodiment.

The computing unit 21 is different from the computing unit 11 of the first embodiment in that a zoom computing unit 211, a focus computing unit 212, an iris computing unit 213, and an extender computing unit 214 are used in place of the zoom computing unit 111, the focus computing unit 112, the iris computing unit 113, and the extender computing unit 114, respectively. Those computing units act on different drive targets but have the same configuration. Accordingly, description is made of only the zoom computing unit 211.

Figure 7:
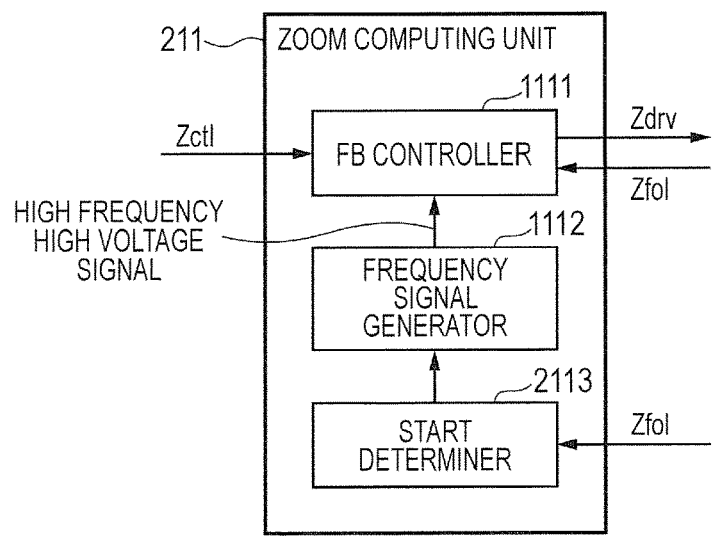
FIG. 7 is a function block diagram of a zoom computing unit 211 of the second embodiment.

FIG. 7 is a function block diagram of the zoom computing unit 211. The zoom computing unit 211 is different from the zoom computing unit 111 of the first embodiment in that a start determiner 2113 is added. The start determiner 2113 receives input of the position signal Zfol for the zoom lens. When the condition described below is satisfied, the start determiner 2113 outputs a high frequency high voltage start signal to the frequency signal generator 1112. Then, the frequency signal generator 1112 outputs a high frequency high voltage signal to the FB controller 1111.

Figure 8:
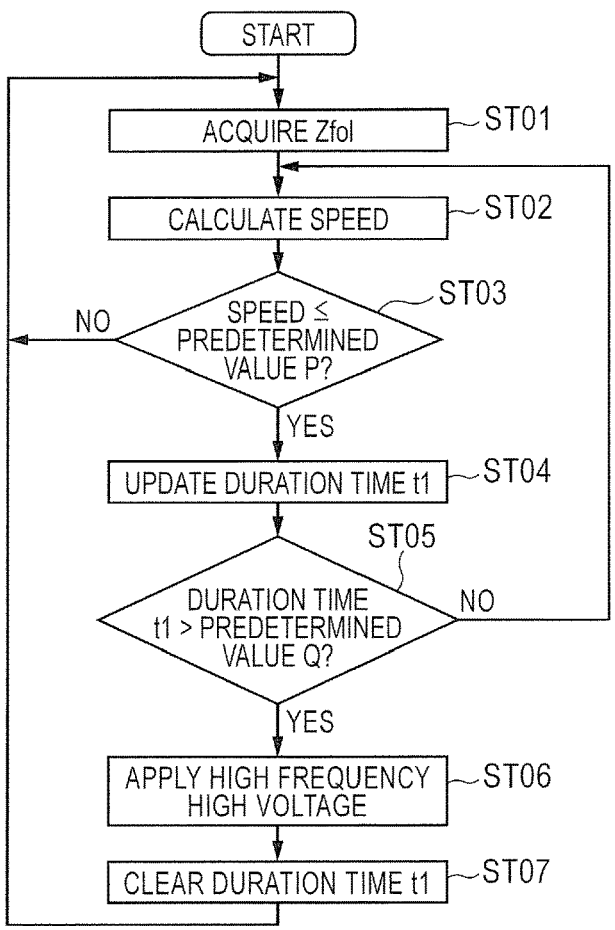
FIG. 8 is a flowchart for illustrating processing of a start determiner 2113 in the second embodiment.

Next, with reference to FIG. 8, description is made of an operation of the start determiner 2113.

FIG. 8 is a flowchart for illustrating processing in the start determiner 2113.

In FIG. 8, after the processing is started, the position signal Zfol for the zoom lens is acquired in Step ST01, and a speed of the zoom lens is calculated in Step ST02. When the speed of the zoom lens is equal to or lower than a predetermined value P in Step ST03, the processing proceeds to Step ST04. When the speed of the zoom lens exceeds the predetermined value P, the processing returns to Step ST01. A low-speed duration time t1 is updated in Step ST04. When the low-speed duration time t1 is longer than a predetermined value Q, that is, longer than a predetermined time period in Step ST05, the processing proceeds to Step ST06. When the low-speed duration time t1 is equal to or shorter than the predetermined value Q, the processing returns to Step ST02.

Then, a high frequency high voltage start signal is output in Step ST06, and the low-speed duration time t1 is cleared in Step ST07.

With the processing described above, when the zoom lens is continuously operated at low speed for a certain time period, it is determined that the defect is liable to occur between the commutator and the brush which are the electric contacts of the motor, and the high frequency high voltage signal of the present invention is superimposed on the motor. In general, the low voltage low current state is given during the low-speed operation. Therefore, the determination of whether or not the low voltage and low current state is given is made based on the driving speed in the second embodiment.

Even when the supply of power to the motor becomes zero after continuation of the low voltage low current state, the defect of the motor, which is the problem to be solved by the present invention, is not eliminated.

Therefore, it is preferred that, for example, even when the power supply for the lens apparatus is turned off, or even when the zoom lens is brought into a manual operation state to turn off the servo (zero control output and zero motor driving voltage), the duration time be temporarily stored in a memory or the like of the lens apparatus, and that the duration time be updated when the low voltage low current state is restarted (that is, when the power is turned on).

Further, even when driving in a middle-to-high speed range which is out of the condition for the low voltage low current state is performed after the zoom lens is continuously operated at low speed for a certain time period, the defect of the motor, which is the problem to be solved by the present invention, is not eliminated when the driving period in the middle-to-high speed range is short. Therefore, it is preferred that the duration time be temporarily stored without being cleared until the low voltage low current state is restarted.

Third Embodiment

Description is made of a third embodiment of the present invention.

When a state in which a difference α between the control signal Zctl and the position signal Zfol for the zoom lens is equal to or less than a predetermined value continues for a certain time period, similarly to the case where the low voltage low current state continues, the defect involving increase in contact resistance between the commutator and the brush which are the electric contacts of the motor may occur. That is, regardless of whether or not the motor moves, the defect of the motor, which is the problem to be solved by the present invention, occurs when the low voltage and the low current are continuously applied to the motor.

Therefore, in a lens apparatus 3 according to the third embodiment, the condition for superimposition of the high frequency high voltage to be performed in the start determiner is changed from that in the lens apparatus 2 according to the second embodiment. Now, description is made of the difference.

Figure 9:
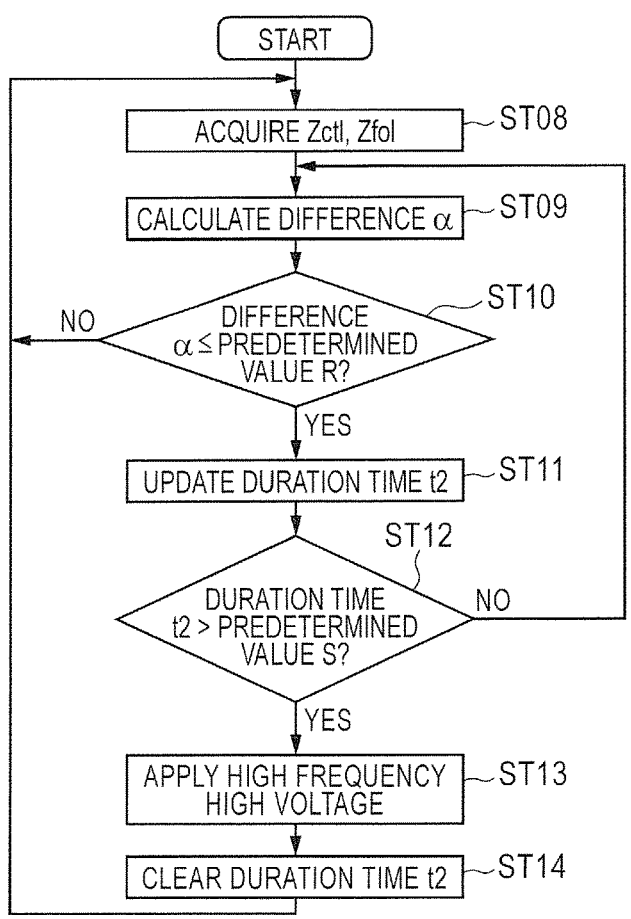
FIG. 9 is a flowchart for illustrating processing of the start determiner 2113 in a third embodiment of the present invention.

FIG. 9 is a flowchart for illustrating the condition for superimposition of the high frequency and the high voltage of the third embodiment, which is changed from that in the second embodiment.

In FIG. 9, after the processing is started, the control signal Zctl and the position signal Zfol for the zoom lens are acquired in Step ST08, and the difference α (α=Zctl-Zfol) between the control signal Zctl and the position signal Zfol for the zoom lens is calculated in Step ST09. When the difference α is equal to or less than a predetermined value R in Step ST10, the processing proceeds to Step ST11. When the difference α exceeds the predetermined value R, the processing returns to Step ST08. A duration time t2 in which the difference α of equal to or less than the predetermined value R continues is updated in Step ST11. When the duration time t2 in which the difference α of equal to or less than the predetermined value R continues exceeds the predetermined value S in Step ST12, the processing proceeds to Step ST13. When the duration time t2 is equal to or less than the predetermined value S, the processing returns to Step ST9.

Then, a high frequency high voltage start signal is output in Step ST13, and the duration time t2 in which the difference α of equal to or less than the predetermined value R continues is cleared in Step ST14.

Figure 10:
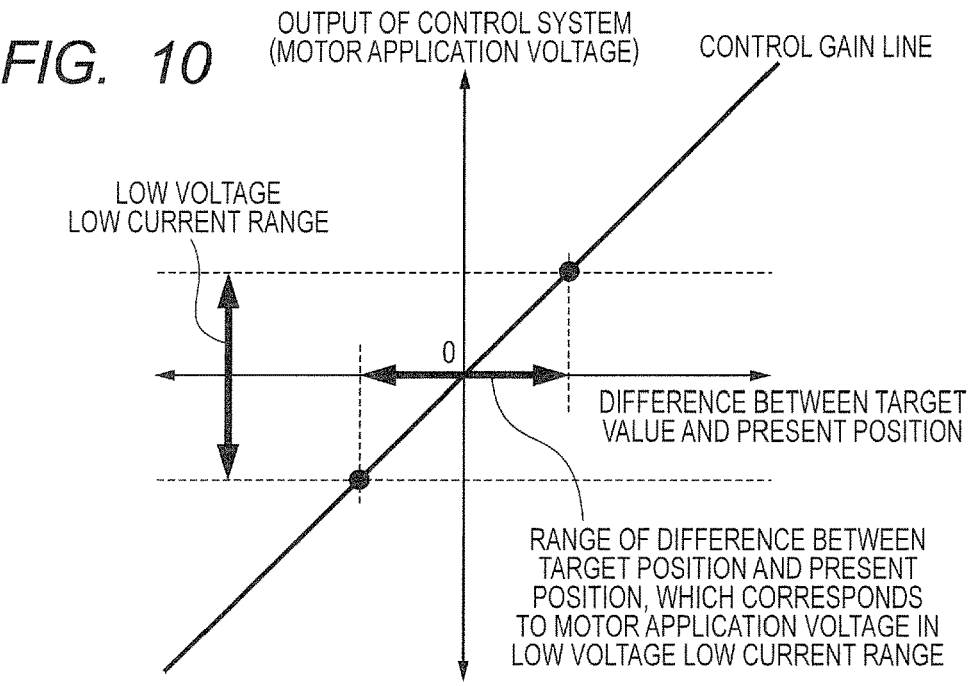
FIG. 10 is a diagram for illustrating control gain characteristics of the third embodiment.

Now, with reference to FIG. 10, description is made of a method of determining the above-mentioned predetermined value R.

FIG. 10 is a diagram for illustrating output of a control system with respect to a difference between a target (target position) and a present status (present position) in a general feedback control system.

In the general feedback control system, in accordance with a line determined by the control gain (control gain line of FIG. 10), as the difference between the target (target position) and the present status (present position) increases, the output of the control system increases. Through use of this relationship, the difference α which is the output of the control system similar to that for the low voltage low current state of the second embodiment is reversely calculated to determine the above-mentioned predetermined value R of the third embodiment.

In general, the driving condition of the motor in the low voltage low current state differs in accordance with an environment of use, a period of use, an individual difference of a lens, and the like.

For example, under a low-temperature environment, the driving current becomes larger than a driving current which is given under a normal-temperature environment due to increase in viscosity of grease at the movable part. Also when the movable part is driven in a direction of being opposed to a gravity due to a posture difference in the lens, the driving current becomes larger. Further, when the period of use becomes longer, the driving voltage current tends to become larger due to the influence of degradation or reduction of grease applied to the driving unit. Further, the driving voltage current differs in accordance with an individual difference of a lens.

As described above, the driving voltage current of the motor greatly differs under various situations. Therefore, when the high voltage high frequency signal is to be superimposed, the low voltage low current state of the motor can be determined with higher accuracy by adding the difference between the target position and the present position as one of the determination references as in the third embodiment than a case of using only the driving speed of the motor as the determination reference as in the second embodiment.

Fourth Embodiment

Description is made of a fourth embodiment of the present invention.

The fourth embodiment is different from the first to third embodiments in that a control system configured to perform feedback of a current on the driving unit (current FB control system) is employed, and in that a low-pass filter (hereinafter referred to as "LPF") is used for the current FB control system so as to avoid the influence of the high frequency high voltage to be superimposed.

Now, description is made of the difference.

Figure 11:
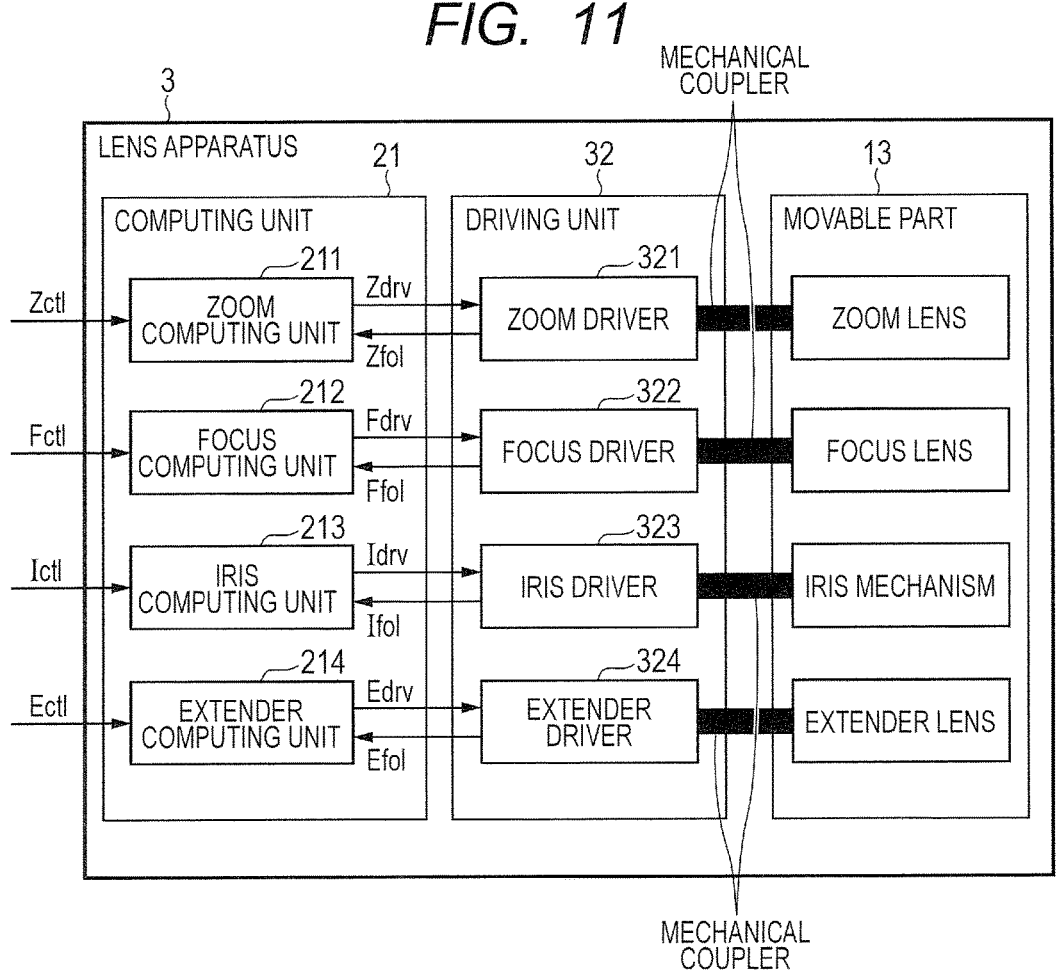
FIG. 11 is a function block diagram of a lens apparatus 3 according to a fourth embodiment of the present invention.
Figure 12:
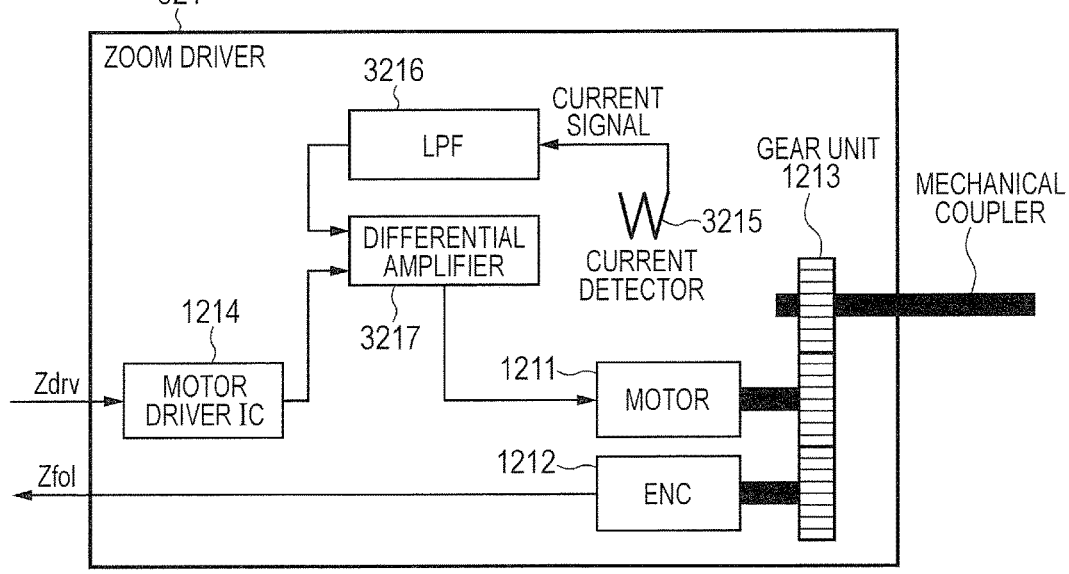
FIG. 12 is a function block diagram of a zoom driver 321 of the fourth embodiment.

FIG. 11 is a function block diagram of the lens apparatus 3 according to the fourth embodiment, and a driving unit 32 is used in place of the driving unit 12 of the second embodiment. Further, the driving unit 32 includes a zoom driver 321, a focus driver 322, an iris driver 323, and an extender driver 324. A function block diagram of the zoom driver 321 is illustrated in FIG. 12. Although not illustrated in FIG. 12, the focus driver 322, the iris driver 323, and the extender driver 324 have the same configuration as that of the zoom driver 321.

The drivers are different in that a current detector 3215, an LPF 3216, and a differential amplifier 3217 are added to each of the zoom driver 121, the focus driver 122, the iris driver 123, and the extender driver 124 of the second embodiment.

Now, with reference to the function block diagram of the zoom driver 321 of FIG. 12, detailed description is made of the zoom driver 321.

The current detector 3215 is a well-known and well-used resistor for current detection. The LPF 3216 is a well-known and well-used low-pass filter (hereinafter also referred to as "LPF"). The differential amplifier 3217 is a well-known and well-used differential amplifying device. A motor driving current of the detection target is detected as a voltage (current signal). Only components having a frequency equal to or lower than a predetermined frequency are left, and a difference with respect to the driving signal which is output by the motor driver IC 1214 is taken.

With this configuration, the current feedback is applied only to the motor driving current component of components having a frequency equal to or less than the predetermined frequency. As a result, quick feedback which does not involve software can be provided, and at the same time, the influence of the high frequency high voltage signal can be avoided.

It is preferred that the cut-off frequency of the LFP be determined within a range in which the influence of the frequency of the high frequency high voltage signal which is to be superimposed is eliminated and in which the responsiveness of the control system is not impaired.

Fifth Embodiment

Description is made of a fifth embodiment of the present invention.

In the fifth embodiment, a low-pass filter (hereinafter referred to as "LPF") is used for the FB control system configured to perform feedback control on the movable part so as to avoid the influence of the high frequency high voltage which is to be superimposed.

That is, an FB controller 1114 of the fifth embodiment is different from the FB controller 1111 of the first embodiment in that an SW unit, an SW changeover determining unit, and the LPF are added.

Now, description is made of the above-mentioned difference.

Figure 13:
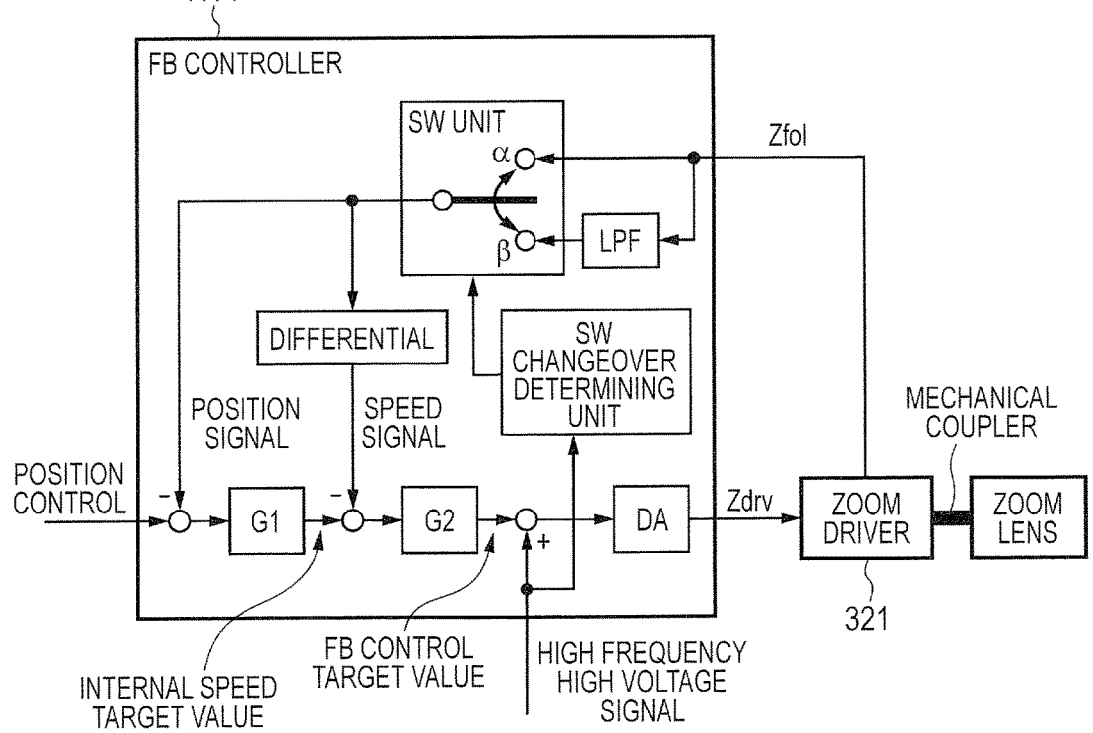
FIG. 13 is a function block diagram of an FB controller 1114 of a fifth embodiment of the present invention.

FIG. 13 is a function block diagram of the FB controller 1114 of the fifth embodiment.

The SW unit is a selection unit configured to determine whether or not the LPF is to be included in the feedback control. When the SW unit selects the α-side, the position signal Zfol for the zoom lens is directly fed back. When the SW unit selects the β-side, the position signal Zfol for the zoom lens is fed back through the LPF.

Figure 14:
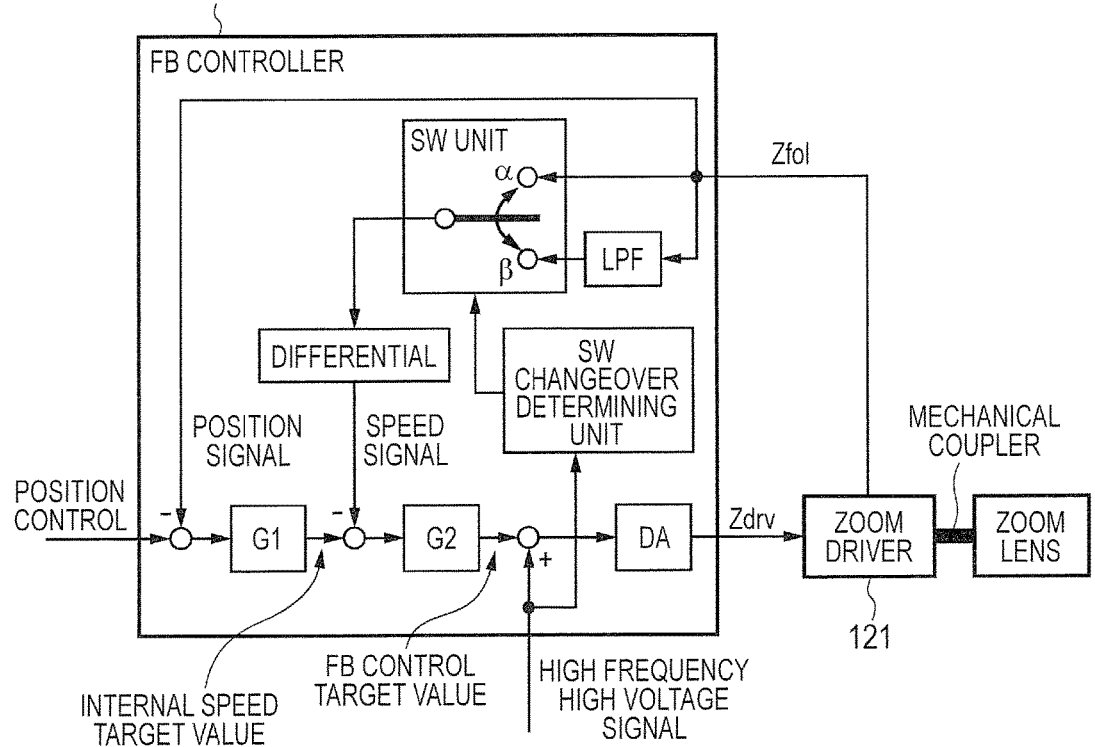
FIG. 14 is a function block diagram of an FB controller 1115 of the fifth embodiment.

FIG. 14 is a function block diagram of the FB controller 1115, which is a variation of the fifth embodiment.

The FB controller 1115 is different from the FB controller 1114 in that the LPF can be applied only to the speed signal. The operation of the SW unit is the same as the operation of the FB controller 1114. When the SW unit selects the α-side, the position signal Zfol for the zoom lens is directly fed back to a speed loop. When the SW unit selects the β-side, the position signal Zfol for the zoom lens is fed back to the speed loop through the LPF. In general, in the feedback control, speed information expressed by differentiation of the position information has higher responsiveness than the position information. Therefore, in the FB controller 1115 having the variation configuration, the LPF is applied only to the speed loop having the high responsiveness, thereby being capable of using the LPF with minimum necessity.

It is preferred that the cut-off frequency of the LFP be determined within a range in which the influence of the frequency of the high frequency high voltage signal which is to be superimposed is eliminated and in which the responsiveness of the control system is not impaired.

Sixth Embodiment

Description is made of a sixth embodiment of the present invention.

In the sixth embodiment, variation of the high frequency high voltage signal illustrated in FIG. 5 of the first embodiment is applied. Now, with reference to FIG. 15 to FIG. 19, description is made of the variation.

Figure 15:
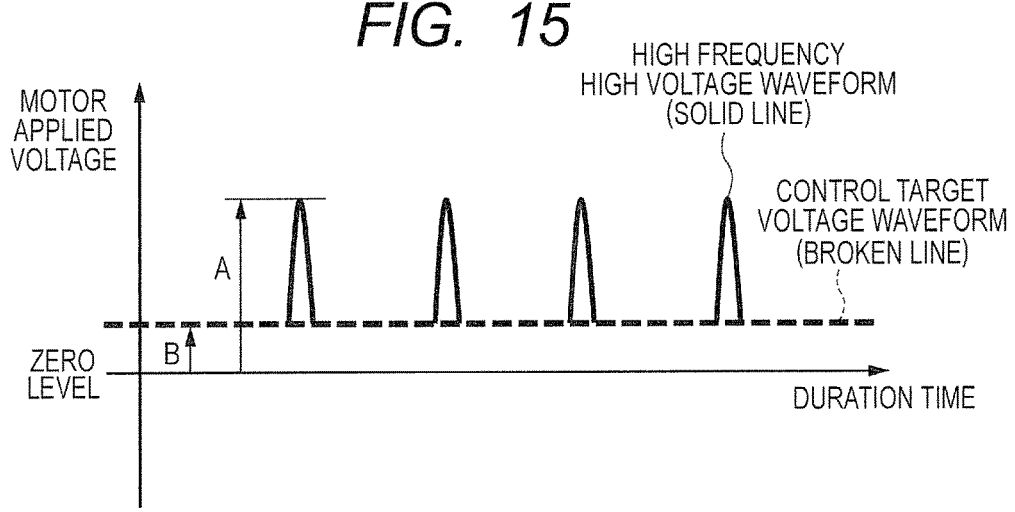
FIG. 15 is a schematic diagram for illustrating a waveform of a high frequency high voltage signal of a sixth embodiment of the present invention.
Figure 16:
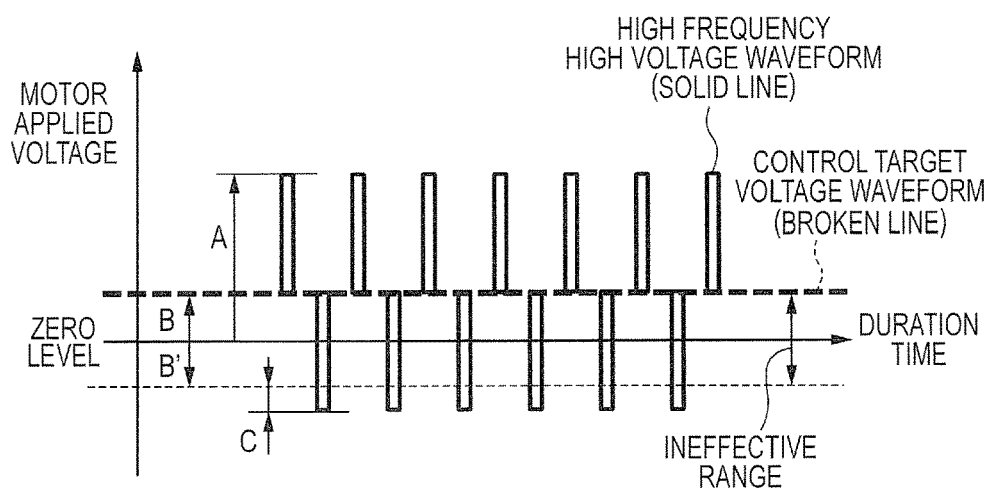
FIG. 16 is a schematic diagram for illustrating a waveform of the high frequency high voltage signal of the sixth embodiment.
Figure 17:
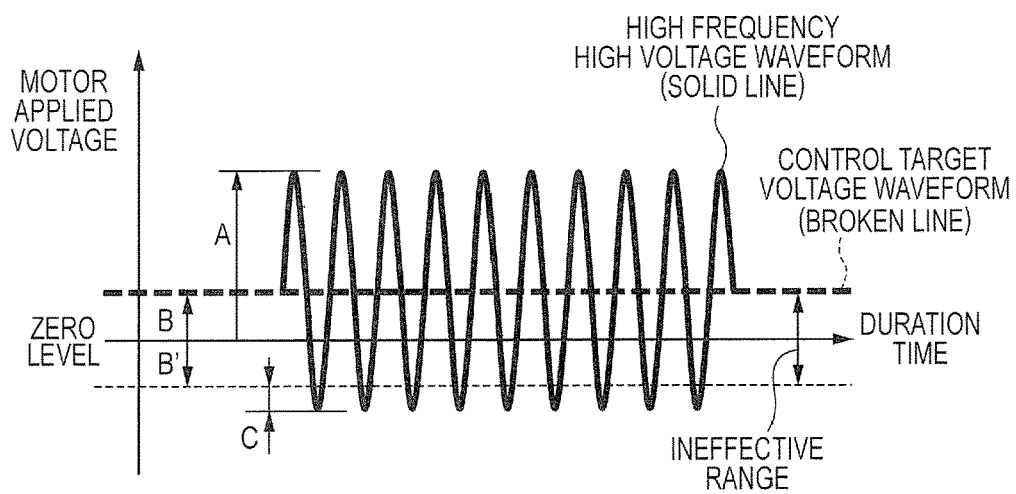
FIG. 17 is a schematic diagram for illustrating a waveform of the high frequency high voltage signal of the sixth embodiment.
Figure 18:
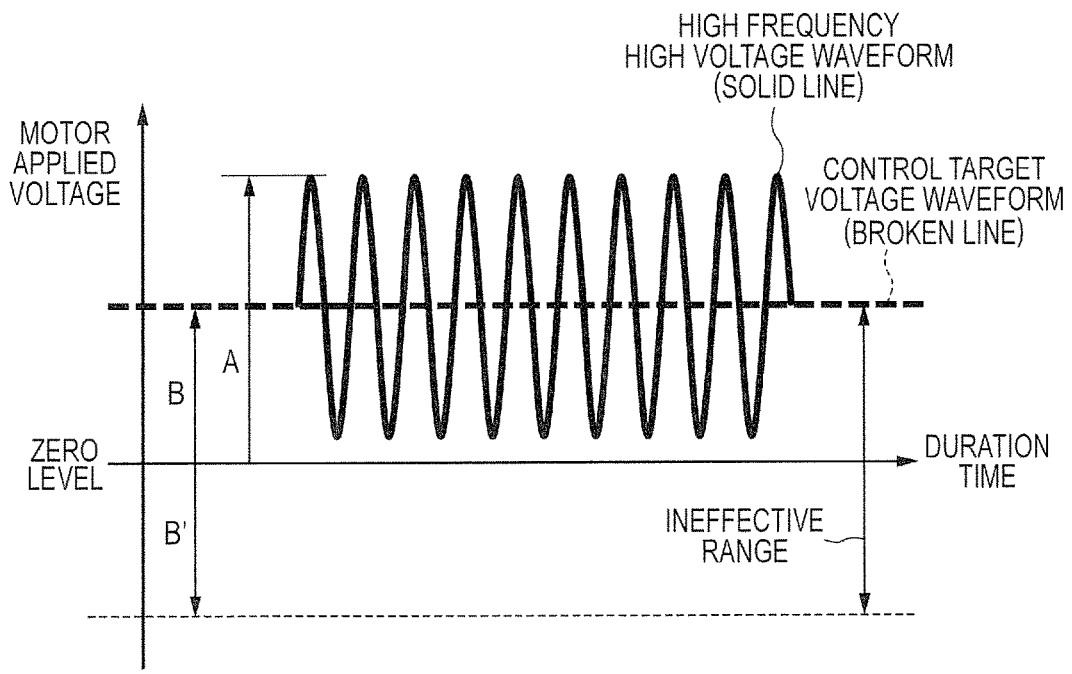
FIG. 18 is a schematic diagram for illustrating a waveform of the high frequency high voltage signal of the sixth embodiment.
Figure 19:
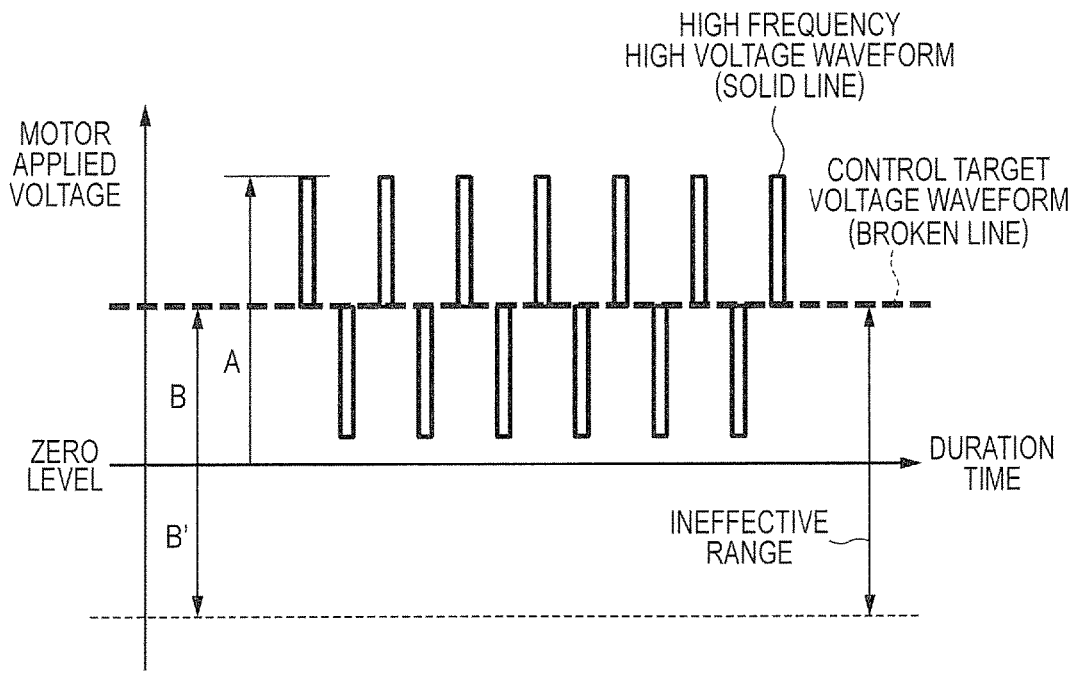
FIG. 19 is a schematic diagram for illustrating a waveform of the high frequency high voltage signal of the sixth embodiment.

In FIG. 15, a half-wave waveform of a sine wave having a peak value A is illustrated, while the rectangular wave is illustrated in FIG. 5 in the first embodiment. In FIG. 16, a rectangular wave is added to the rectangular wave of FIG. 5 so that the rectangular wave is folded down over the control target voltage signal. Further, FIG. 17 is an illustration of a case where the rectangular wave of FIG. 16 is changed to the sine wave.

When the control target voltage signal is in the low voltage low current state and has a peak value B, the high frequency high voltage signal of the present invention needs to be set so that the peak value of the high frequency high voltage signal is larger than the peak value of +B or smaller than the peak value of −B. Thus, in the cases of FIG. 16 and FIG. 17 where the high frequency high voltage signal of the present invention is added to both upper and lower sides of the control target voltage signal, in the negative value side, only the portion C where the peak value of the high frequency high voltage signal is smaller than −B provides the effect of the present invention, the portion where the peak value is in the range within ±B does not show the effect of the present invention. Similarly, in the cases of FIG. 18 and FIG. 19, the high frequency high voltage signal which is superimposed on the lower side of the control target voltage signal is not out of the range of ±B, with the result that the lower side portion cannot provide the effect of the present invention.

Therefore, as in the cases of FIG. 5 and FIG. 15, it is preferred that, with the zero level of the motor applied voltage as a reference, the high frequency high voltage signal be superimposed on the side having the same polarity as the control target voltage signal. Alternatively, as in the cases of FIG. 16 and FIG. 17, it is preferred that the peak value of the high frequency high voltage signal be set so as to exceed the ineffective range of ±B.

Further, the frequency of the high frequency high voltage signal needs to be set so as to prevent movement of the driving unit and an optical lens being a drive target and set in consideration of noise and durability. Therefore, it is preferred that the frequency be set within a range of equal to or higher than 20 Hz and equal to or lower than 100 Hz, which is close to a lower limit of an audio frequency of a human.

In the above, description is made based on the driving voltage. However, the present invention is also applicable when the driving voltage is replaced with a driving current.

Seventh Embodiment

Description is made of a seventh embodiment of the present invention.

Figure 20:
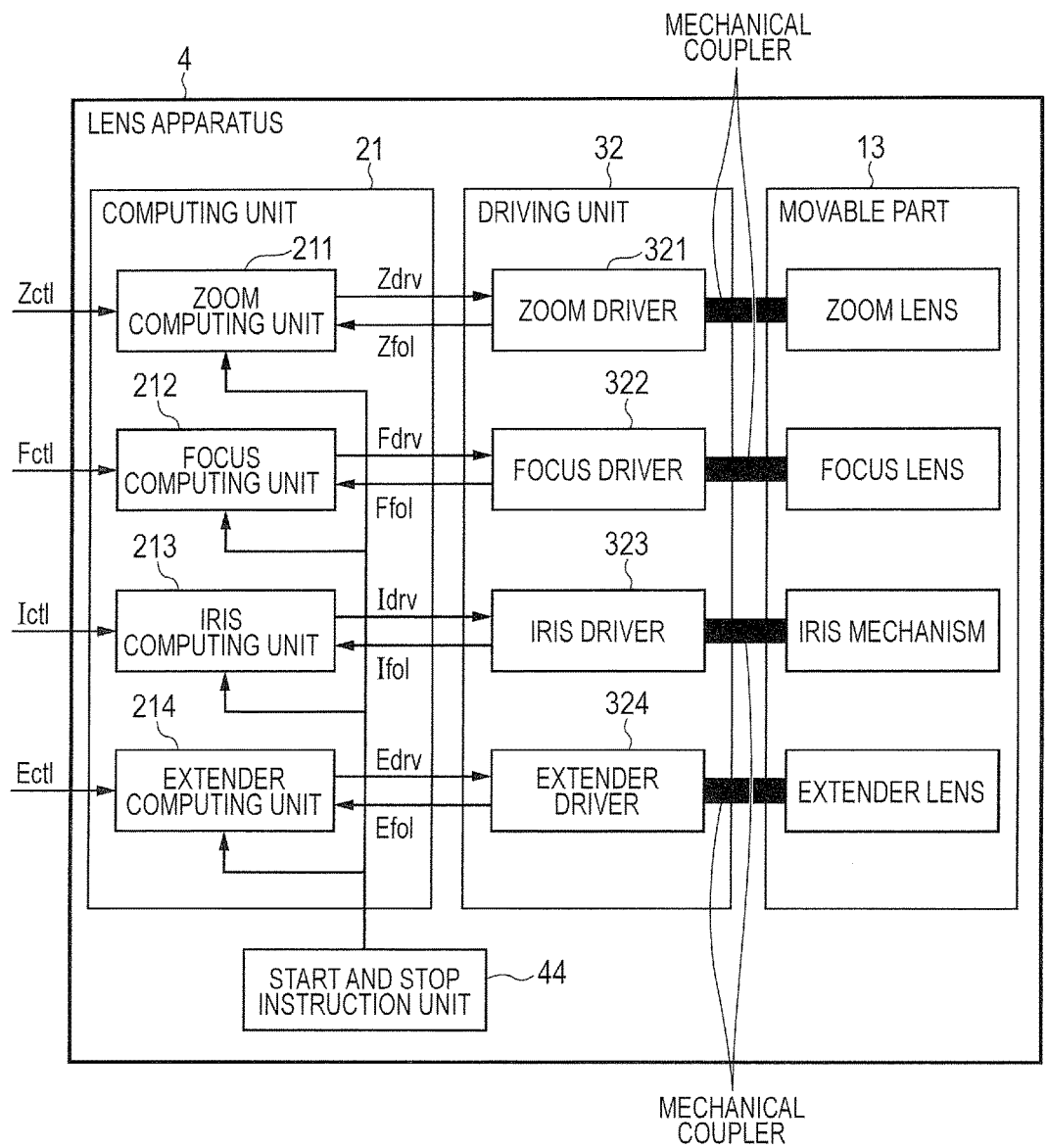
FIG. 20 is a function block diagram of a lens apparatus 4 according to a seventh embodiment of the present invention.

FIG. 20 is a function block diagram of a lens apparatus 4 according to the seventh embodiment. The lens apparatus 4 according to the seventh embodiment is different from the lens apparatus 3 according to the fourth embodiment in that a start and stop instruction unit 44 is added.

The start and stop instruction unit 44 includes a well-known and well-used mechanical switch. When a starting state is selected with the mechanical switch, superimposition of the high frequency high voltage signal is started. When a terminating state is selected with the mechanical switch, superimposition of the high frequency high voltage signal is stopped.

As described above, in the seventh embodiment, an operator or the like who operates the lens can select whether or not to superimpose the high frequency high voltage signal as needed.

Further, as in the second embodiment and the third embodiment, the necessity of the superimposition of the high frequency high voltage signal may be determined in the lens as needed, and the superimposition of the high frequency high voltage signal may be prompted to the operator or the like through use of an LED or a display.

Further, it is only necessary that the present invention have a configuration in which not only the DC motor but also the electric contacts which are held in slide contact with each other are provided, and in which the low voltage low current state continues between the contacts. Accordingly, a DC motor including a slip ring, an information transmission device, or the like is also effective.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-157576, filed Aug. 10, 2016, which is hereby incorporated by reference herein in its entirety.

What is claimed is:

1. A controlling apparatus for an electric motor which is driven in accordance with a driving signal input through electric contacts held in slide contact with each other, the controlling apparatus comprising:
    a signal generating unit which generates a signal having a peak voltage higher than a voltage of the driving signal; and a controlling unit which generates the driving signal based on a controlling signal input so as to control the driving of the electric motor, and superimposes the signal onto the driving signal and outputs the resultant signal to the electric motor, wherein the controlling unit superimposes the signal onto the driving signal and outputs the resultant signal to the electric motor when a state in which the driving signal is lower than a predetermined voltage continues for a time period which is longer than a predetermined time period.

2. The controlling apparatus according to claim 1, wherein the signal generating unit generates a signal which prevents movement of one of the electric motor and a driven part driven by the electric motor.

3. The controlling apparatus according to claim 1, wherein the signal generating unit generates a frequency signal as the signal.

4. The controlling apparatus according to claim 1, wherein the controlling unit determines that the driving signal is lower than the predetermined voltage when one of a speed of the electric motor and a speed of the driven part driven by the electric motor is lower than a predetermined speed.

5. The controlling apparatus according to claim 1, wherein the controlling unit determines that the driving signal is lower than the predetermined voltage when a difference between a target position of one of the electric motor and the driven part driven by the electric motor, the target position being set in accordance with the controlling signal, and a present position of one of the electric motor and the driven part driven by the electric motor is less than a predetermined threshold.

6. The controlling apparatus according to claim 1, wherein the controlling unit superimposes the superimposed signal and outputs the resultant signal to the electric motor when power of the controlling apparatus is turned on.

7. The controlling apparatus according to claim 1, wherein the driving signal has a voltage lower than 1 V, wherein the superimposed signal has a peak voltage equal to or lower than 1 V, and wherein the superimposed signal has a frequency equal to or higher than 20 Hz and equal to or lower than 100 Hz.

8. The controlling apparatus according to claim 1, wherein the electric motor comprises a DC motor including a commutator and a brush constructing the electric contacts.

9. The controlling apparatus according to claim 1, wherein the electric motor comprises an AC motor including a slip ring constructing the electric contacts.

10. The controlling apparatus according to claim 1, further comprising:

a differential amplifier which amplifies the driving signal from the controlling unit;

a current detector which detects a current of the driving signal output to the electric motor; and a low-pass filter which has a cut-off frequency lower than a frequency of the superimposed signal with respect to the detected current which is to be fed back to the differential amplifier.

11. The controlling apparatus according to claim 1, wherein the controlling unit performs feedback control with respect to a driving speed of the driven part driven by the electric motor and includes a low-pass filter having a cut-off frequency lower than the frequency of the superimposed signal.

12. A lens apparatus, comprising:

a controlling apparatus for an electric motor which is driven in accordance with a driving signal input through electric contacts held in slide contact with each other, the controlling apparatus comprising:

a signal generating unit which generates a signal having a peak voltage higher than a voltage of the driving signal; and a controlling unit which generates the driving signal based on a controlling signal input so as to control the driving of the electric motor, and superimposes the signal onto the driving signal and outputs the resultant signal to the electric motor, wherein the controlling unit superimposes the signal onto the driving signal and outputs the resultant signal to the electric motor when a state in which the driving signal is lower than a predetermined voltage continues for a time period which is longer than a predetermined time period;

an electric motor which is driven in accordance with control by the controlling apparatus; and a movable optical member which is driven in accordance with control by the electric motor.

* * * * *